United States Patent [19]

Gary et al.

[11] 4,021,703

[45] May 3, 1977

[54] PHASE IMBALANCE DETECTION CIRCUIT

[75] Inventors: Wardell Gary; Glenn R. Taylor, both of Beaver; Donald S. Kimmel, Monroeville, all of Pa.

[73] Assignee: Westinghouse Electric Corporation, Pittsburgh, Pa.

[22] Filed: June 2, 1975

[21] Appl. No.: 583,219

[52] U.S. Cl. .................. 361/85; 340/248 B; 328/151; 361/76; 361/88
[51] Int. Cl.² ......................................... H02H 3/12
[58] Field of Search ............... 317/46, 47, 48, 31; 340/248 B; 307/235 A; 324/82, 103 P; 328/151

[56] References Cited

UNITED STATES PATENTS

| | | | |
|---|---|---|---|
| 3,123,813 | 3/1964 | Baude | 317/47 X |
| 3,300,650 | 1/1967 | Daien | 317/46 X |
| 3,575,637 | 4/1971 | Krieger et al. | 317/46 X |
| 3,636,541 | 1/1972 | Genuit et al. | 340/248 B |
| 3,846,692 | 11/1974 | Hill | 307/235 A X |

Primary Examiner—J D Miller
Assistant Examiner—Patrick R. Salce
Attorney, Agent, or Firm—M. J. Moran

[57] ABSTRACT

A phase imbalance logic module for a solid state motor protection system for a three-phase motor. Three-phase line currents are converted to corresponding voltages and rectified. The resultant output voltage is a poorly regulated DC voltage having a ripple of approximately 4% during normal operating conditions. In the event of a phase failure, even if not total, the corresponding ripple percentage increases. The phase imbalance logic network senses ripple and provides an output signal to trip a protective circuit breaker if the component of ripple becomes significantly large.

18 Claims, 5 Drawing Figures

PHASE IMBALANCE DETECTION CIRCUIT

CROSS REFERENCE TO RELATED APPLICATIONS

Certain inventions related to those disclosed in the present invention are disclosed and claimed in the copending applications Ser. No. 504,405, filed Sept. 9, 1974 by D.S. Kimmel, W. Gary and G. R. Taylor and Ser. No. 504,404, filed on Sept. 9, 1974 by W. Gary and G. R. Taylor, and application Ser. No. 583,323 filed concurrently herewith on June 2, 1975 by W. Gary and G. R. Taylor, all of which are assigned to the same assignee as the present application.

BACKGROUND OF THE INVENTION

1. Field of the Invention

The subject matter of this invention is related generally to solid state devices for detecting phase imbalance in a three-phase load and is related specifically to a DC ripple detecting device for accomplishing this purpose.

2. Description of the Prior Art

It is known in the prior art to provide phase imbalance logic circuits which may be utilized to trip a circuit breaker to protect a three-phase load, such as a motor if one of the phases completely drops out. It would be advantageous if means were provided for sensing current imbalance in one or more phases in a three-phase load where the current imbalance is not necessarily complete, that is, where the current does not necessarily completely go to zero, but rather is maintained at some intermediate value between zero and the balanced value or even at some higher value than the balanced value. In addition, it would be advantageous of a DC ripple detecting device could be provided which somehow referenced the ripple voltage against voltage peak rather than zero. This would give greater sensitivity in the ripple measuring operation. Further, it would be in keeping with the concept that ripple is generally measured as some percent of full scale, or rated voltage.

SUMMARY OF THE INVENTION

In accordance with the invention, a DC ripple detecting device capable of being utilized on a three-phase circuit is taught. The device measures ripple as a function of peak current value in a given increment of time. The basic ripple detecting device comprises a capacitive element connected in series with a diode, both of which are connected across the output terminals of the power source being monitored. The capacitive device has the capability of storing the peak value of the voltage of the power supply for a relatively long period of time. A voltage divider device is connected across the capacitive device to provide at one point thereof a voltage which is proportional to a percentage of the peak voltage being stored by the capacitive device. There is provided a switch means having first and second terminals and a gate terminal. The switch means may be a transistor. The first terminal is connected in circuit relationship with the plus side of the power source being monitored and the negative or second terminal is connected in circuit relationship with the minus side of the power source being monitored. The gate of the switch device or transistor base is connected in circuit relationship with the voltage divider terminal of the voltage dividing network. The low side of the voltage dividing network and the low side of the capacitor are connected through the diode to the low side of the transistor or switch means and to the minus terminal. The first and second terminals of the switch means, which may be the collector and emitter, respectively, of the transistor, have generally impressed thereacross the instantaneous value of the voltage from the power supply. However, the capacitive element has impressed thereacross only the most recent peak value of the power source voltage. Since the high side of the capacitive element and the high side of the transistor element are connected together in circuit relationship, only the low side of the transistor element or the emitter in the case of an NPN transistor can track the instantaneous value of the power source voltage. If the power source voltage becomes small, such as when the valley of a ripple is being monitored, the emitter has a tendency to become more positive than the low side of the capacitor to consequently reverse bias the previously described diode. If the ripple is extremely high, such as to cause a relatively low valley voltage value, the emitter can become higher in voltage value than the voltage on the base as controlled by the voltage divider network. This has a tendency to turn an ON transistor or switch means OFF. The change of state of the switch means can be utilized to provide an indication of high ripple content in the monitored DC voltage, which in turn, can be shown to be related to phase drop-out or reduction. The latter change of state can be used to trip a circuit breaker. In one embodiment of the invention, the sequential turning ON and OFF of the transistor or gated switch as peaks and valleys of the DC power source voltage are monitored causes the generation of a series of pulses. The pulses are stored in a pulse accumulator network. When a sufficient number of pulses have been stored, a tripping and/or indicating operation may take place to cause the tripping of a circuit breaker and/or the indication of phase imbalance.

BRIEF DESCRIPTION OF THE DRAWINGS

For a better understanding of the invention, reference may be had to the preferred embodiments exemplary of the invention shown in the accompanying drawings, in which.

DESCRIPTION OF THE PREFERRED EMBODIMENT

Figure 1:
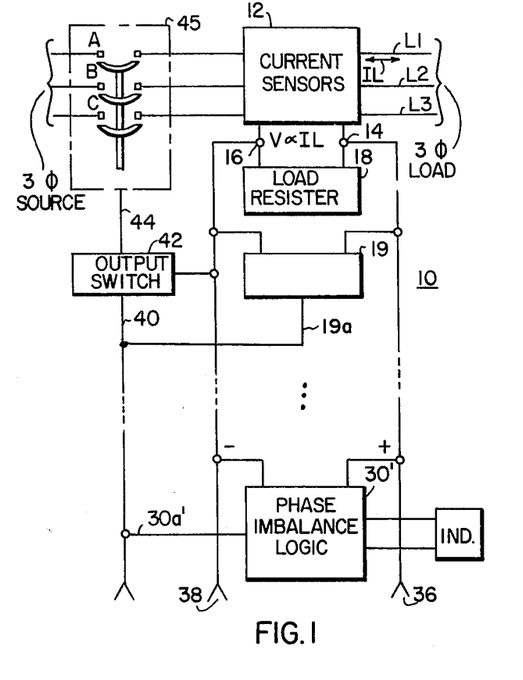
FIG. 1 shows a three-phase current sensitive circuit protection system utilizing a phase imbalance logic module.

Referring now to the drawings, and FIG. 1 in particular, a current sensitive solid state multi-element circuit protective system for a three-phase load is shown. A detailed description of the operation of a system similar to the one shown in FIG. 1 may be found in the previously described copending application Ser. No. 504,405. In the present invention, a detailed description of the phase imbalance logic module 30' is provided hereinafter. With regard to the apparatus of FIG. 1, there are three lines L1, L2 and L3 which are supplied by a three-phase source through a circuit breaker 45 and current sensors 12 to a three-phase load. A current IL may flow in any or all of the lines. The output of the current sensors at lines 14 and 16 is a voltage which is generally proportional to the current IL. In a preferred operating situation, all three lines have flowing therein balanced currents IL, and each current is phase-shifted by 120 electrical degrees from the others. The output signal between the lines 14 and 16 under these operating conditions is a rectified, but generally nonregulated DC voltage signal. When the rectification has been completed, and when the circuits are balanced and properly phased, six peaks and six valleys occur per cycle of voltage between lines 14 and 16. Typically, therefore, a predictable percentage of voltage ripple exists between the terminals 14 and 16. In a well balanced system this percentage of voltage is approximately 4% to 5%. This unregulated voltage is supplied to various operating modules, such as 19, which are also connected in parallel with the terminals 16 and 14. There may be provided an output terminal 19a which interconnects the previously described module 19 with an output switch 42 by way of a line 40. This is useful to introduce a signal on a line 44 which in turn controls the control system of the circuit breaker 45. Consequently, certain current and/or voltage or phase relationships for the three-phase load may cause independent tripping of the circuit breaker 45 other than by a phase imbalance situation. There is also provided a phase imbalance logic network 30' which may include as a part thereof an indicator IND and an output line 30a'. The electrical features of the phase imbalance network 30' will be described hereinafter with respect to FIG. 3. The phase imbalance logic network may cause a tripping of the circuit breaker 45 by providing a signal to the output switch 42 by way of line 40 and output line or terminal 30a' if an imbalance of a predetermined measurable amount occurs in any of the currents IL flowing in the lines L1, L2 and L3. In a preferred embodiment of the invention, a phase imbalance represented by a 20% ripple will cause circuit breaker tripping if the phase imbalance persists for a significant period of time, which may be four or five line cycles. There are also shown parallel connection lines or terminals 36 and 38 where other modules, not described herein, may be provided for performing certain functions in relationship to the voltage V present between the terminals 14 and 16.

Figure 2:
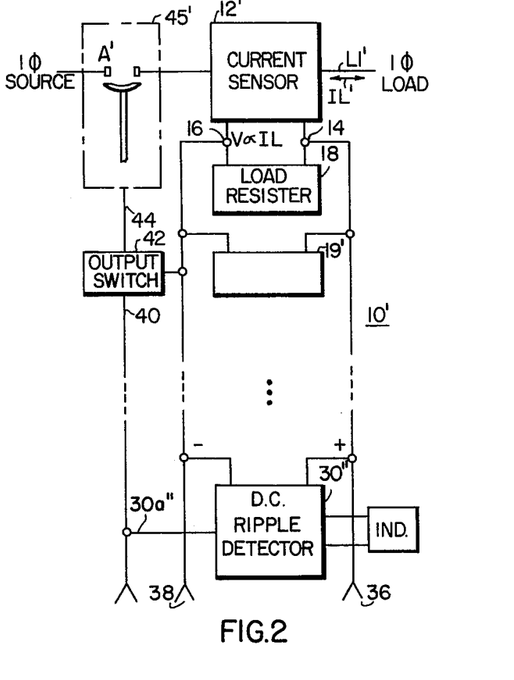
FIG. 2 shows a single phase current sensitive circuit protective system utilizing a DC ripple detector.

Referring now to FIG. 2, a single phase electrical system which is otherwise similar to the system of FIG. 1 is shown. In this embodiment of the invention, a single phase source is protected by a circuit breaker 45' and monitored by a current sensor module 12'. The current sensor module 12' is connected to a line L1', which in turn is connected to a single phase load. The current IL' may flow in the line L1'. The current sensor 12' may have output terminals 14 and 16 similar to those shown in FIG. 1. A voltage V', which may be proportional to the current IL', may be developed between the terminals 14 and 16. As was the case with respect to FIG. 1, module 19' may be connected to terminals 14 and 16 to measure certain electrical characteristics associated with the voltage V' and to provide a signal on line 40 which is sufficient to energize the output switch 42 to a state to cause a signal to exist on the line 44 to thus cause the circuit breaker 45' to open at the separable main contacts A' thereof. In this embodiment of the invention, the phase imbalance logic module 30' of FIG. 1 may be utilized as a DC ripple detector system 30''. This ripple detector 30'' may provide an output signal on line 30a'' to energize the previously described line 40 for causing the circuit breaker 45' to open. The DC ripple detector 30'' may be generally the same as the phase imbalance logic circuit 30' described with respect to FIG. 1 and shown hereinafter in FIG. 3.

Figure 3:
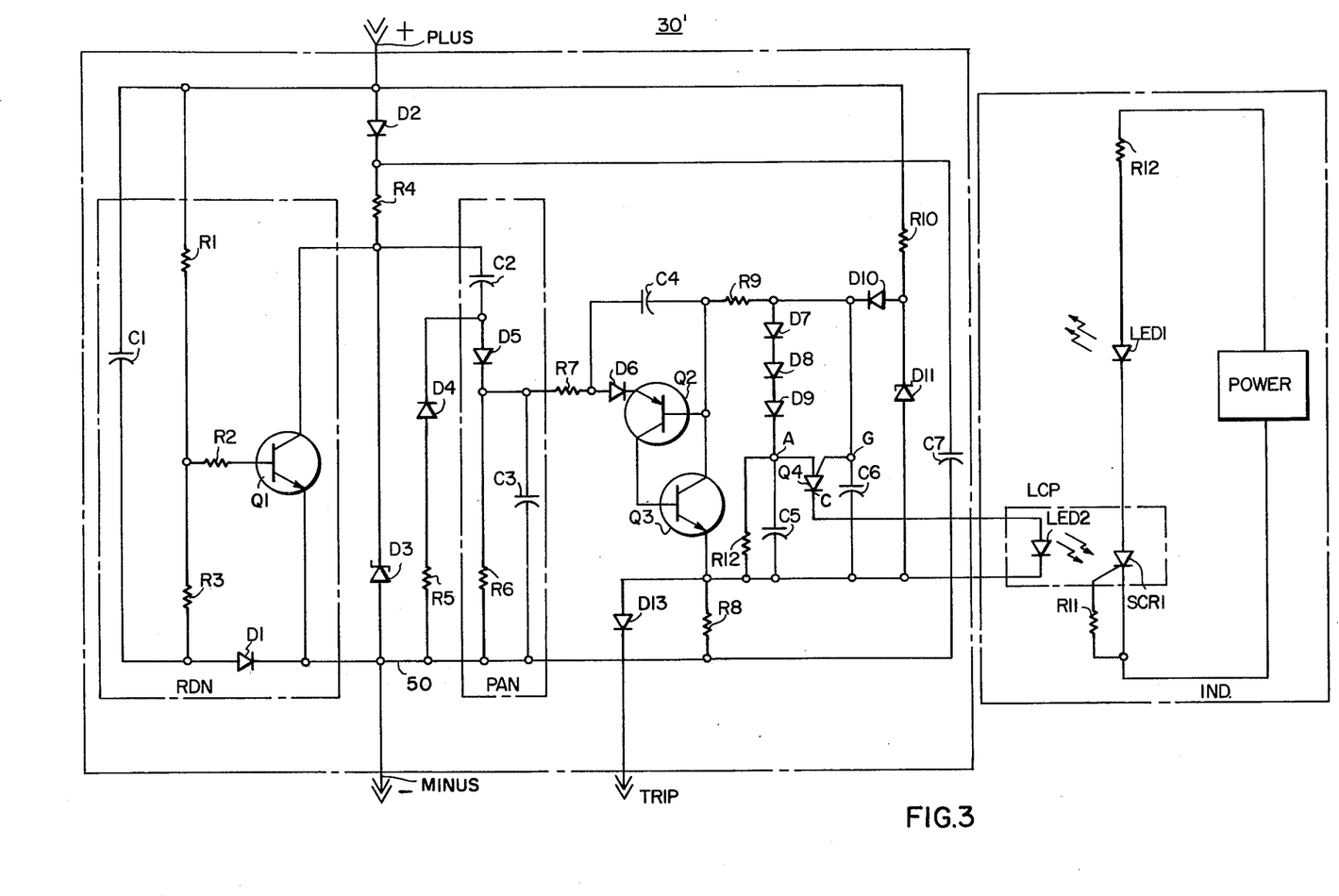
FIG. 3 shows a schematic diagram of the phase imbalance logic module of FIG. 1 and the DC ripple detector system of FIG. 2.

Referring now to FIG. 3, a phase imbalance detector circuit 30' (or DC ripple detector system 30'') is shown. There is provided a PLUS input terminal +, a MINUS input terminal − and a TRIP output terminal for phase imbalance detector network 30'. The PLUS input terminal may be connected to line 14 of the current sensors shown in FIG. 1 and the MINUS terminal may be connected to line 16 of the same current sensors. The TRIP terminal may be connected to line 30a' shown in FIG. 1 or line 30a'' shown in FIG. 2. The indicator circuit IND is shown to the right of FIG. 3, just as it is shown to the right of the phase imbalance logic module 30' in FIG. 1 and/or the DC ripple detector system 30'' of FIG. 2. Connected to the PLUS terminal is one side of a storage capacitive device or storage means C1, one side of a resistive device R1, the anode of a diode D2, and one side of a resistive element R10. The previously described resistive element R1 may comprise the first resistor of a two resistor voltage divider network. The other side of the resistive element R1 is connected to one side of a resistive element R2 and to one side of a resistive element R3. The other side of the resistive element R3 is connected to the other side of the capacitive element C1 and to the anode of a diode D1. The other side of the resistive element R2 is connected to the base of a transistor or similar gated switching means Q1. The emitter of the transistor Q1 is connected to the cathode of the diode D1 at a system common line 50, which is electrically equivalent to the MINUS terminal previously described. The collector of the NPN transistor Q1 is connected to one side of a resistive element R4, to one side of a capacitive element C2, and to the regulating terminal of a Zener diode D3. The anode or other terminal of the Zener diode D3 is connected to the system common line 50. The other side of the resistive element R4 is connected to the cathode of the previously described diode element D2 and to one side of a capacitive element C7, the other side of which is also connected to the system common line 50. The other side of the capacitive element C2 is connected to the anode of a diode D5 and to the cathode of a diode D4. The anode of the diode D4 is connected to one side of a resistive element R5, the other end of which is connected to the common line 50. The cathode of the diode D5 is connected to one end of a resistive element R6, to one end of a capacitive element C3, and to one end of a resistive element R7. The other end of the resistive element R6 and the other end of the capacitive element C3 are connected to the system common line 50. The other end of the resistive element R7 is connected to one end of a capacitive element C4 and to the anode of a diode D6, the cathode of which is connected to the emitter of a PNP transistor Q2. The base of the transistor Q2 is connected to the other side of the capacitive element C4, to one end of a resistive element R9 and to the collector of an NPN transistor Q3. The base of the NPN transistor Q3 is connected to the collector of the PNP transistor Q2. Consequently, the transistor pair comprising the transistors Q2 and Q3 form the well known amplification device known as the Complementary Pair. The emitter of the transistor Q3 is connected to one end of a resistive element R8, to one end of a resistive element R12, to one end of a capacitive element C5, to the cathode of a light emitting diode LEDZ one end of a capacitive element C6, the anode of a zener diode D11 and to the anode of a diode D13. The cathode of the diode D13 is the TRIP output terminal. The other end of the resistive element R8 is connected to the system common line 50. The other ends of the resistive element R12 and the capacitive element C5 are connected together. This common junction is connected to the cathode of a diode D9 and to the anode of an unijunction transistor (UJT) Q4. The gate of the unijunction transistor Q4 is connected to the other side of the resistive element R9, to the anode of a diode D7 and to the cathode of a diode D10. The cathode of the diode D7 is connected to the anode of a diode D8, the cathode of which is connected to the anode of the previously described diode D9. The gate of the programmable unijunction transistor Q4 is also connected to one side of a capacitive element C6. The cathode or output terminal of the programmable unijunction transistor Q4 is connected to the anode of the previously described light emitting diode LEDZ. The anode of the previously described diode D10 is connected to the other end of the previously described resistive element R10 and to the regulating terminal of a Zener Diode D11. The light emitting diode LED2 comprises one-half of a light coupled pair LCP. The other half of the light coupled pair LCP comprises a light sensitive silicon controlled rectifier SCR1 the gate of which is connected to one end of a resistive element R11, the other end of which is connected to the cathode of the light sensitive silicon controlled rectifier, triac or thyristor SCR1. This latter terminal conprises one input terminal for a power supply POWER, the other terminal of which is connected to one side of a resistive element R12. The other side of the resistive element R12 is connected to the anode of a light emitting diode LED1. The cathode of the light emitting diode LED is connected to the anode of the previously descrbed light sensitive silicon controlled rectifier SCR1. The resistive element R12, the light emitting diode LED1, the light coupled pair LCP, and the resistive element R11 form the indicator circuit IND referred to with respect to FIG. 1 and FIG. 2. The resistive element R1, R2 and R3, the capacitive element Cl, and diode D1 and the transistor Q1 comprise a ripple detector network RDN. The resistive element R6, the capacitive elements C2 and C3 and the diode D5 comprise a pulse accululator network PAN. The functions of the ripple detector network RDN, the PULSE accumulator network PAN, and the indicator network IND will be described hereinafter with respect to the operation of the apparatus of FIG. 3.

Figure 3A:
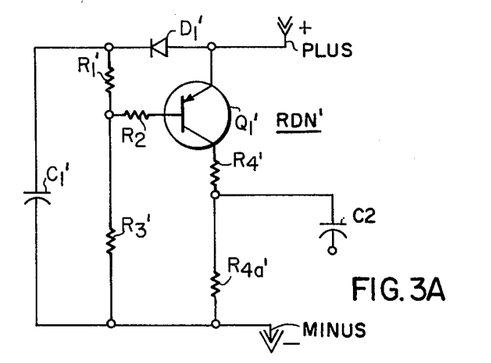
FIG. 3A shows a ripple detector network for the circuit of FIG. 3 where a PNP transistor is utilized rather than the NPN transistor of FIG. 3.

Referring now to FIG. 3A, an alternate embodiment of a ripple detector network circuit RDN' which may utilize an PNP transistor Q1' rather than the NPN transistor Q1 of FIG. 3 is shown. The anode of a diode D' and the emitter of the transistor Q1' are connected to the previously described PLUS +terminal. The cathode of the diode D1' is connected concurrently to one end of a resistive element R1' and to one end of an energy storage capacitive element C1'. The other end of the resistive element R1' is connected concurrently to one end each of the resistive element R2' and to one end of the resistive element R3'. The other end of the resistive element R3' and the other end of the capacitive element C1' are connected together and to the MINUS −terminal. The other end of the resistive element R2' is connected to the base of the transistor Q1', the collector of which is connected to one side of a resistive element R4'. The other side of resistive element R4' is connected to one side of a resistive element R4a' and the high side of the capacitive element C2 shown in FIG. 3. The other side of resistive element R4a' is connected to the MINUS terminal.

OPERATION OF THE PHASE IMBALANCE DETECTOR LOGIC CIRCUIT 30'

Referring once again to FIG. 3, it can be seen that if a source of DC voltage having a ripple component is connected across the PLUS to MINUS terminals of the apparatus 30', ripple detection and appropriate responsive action can be provided. The presence of a significant value of voltage which may be, for example, 10 volts DC beween the PLUS and MINUS terminals, will cause certain initial reactions. First, the capacitive element C7 will be charged through the diode D2 to some value which may be 8 to 10 volts, for example. In addition, the Zener diode D11, which may have a regulating value of 6.8 volts, will be energized to a regulating disposition by the presence of the voltage across the PLUS and MINUS terminals. Current will flow through the resistive element R10, through the diode D10, into the capacitive element C6 to charge that capacitive element to approximately 6.8 volts. The diode D10 will prevent the capacitive element C6 from discharging through the Zener diode D11. The capacitive element C6 maintains a voltage on the gate G of the unijunction transistor Q4. In addition, the capacitive element C6 will maintain a voltage across the diodes D7, D8 and the capacitive element C5 in parallel with the respective element R12, to keep the anode A of the programmable unijunction transistor Q4 at some voltage value which is less than the value on the gate g. Typically, the presence of the three diodes D7 through D9 provides a 1.5 volt voltage drop between the gate G of the programmable unijunction transistor Q4 and the anode A thereof. In this disposition the programmable unijunction transistor Q4 is in the OFF state, that is, no significant current flows out of the cathode C thereof. The capacitive element C6 also provides a voltage at the base of the transistor element Q2. Under normal operating conditions, that is when the ripple content of the DC signal between the terminals 14 and 16 is low, the complementary pair Q2-Q3 is OFF. The resistive element R12, which shunts the capacitive element C5 is a discharge resistor for capacitive element C5. The resistive element R8 provide noise immunity for the TRIP terminal to prevent spurious tripping. The capacitive element C4 also acts as a noise suppression device for the complementary pair comprising the transistors Q2 and Q3. Generally, the voltage which is accumulated on the capacitive element C3 during a nonexcessive ripple condition is significantly less than the voltage at the base of the transistor Q2. This accounts for the complementary pair Q2-Q3 being OFF or in a nonconducting state during low ripple conditions. Presuming now that a DC voltage is supplied between the PLUS and MINUS terminals of the apparatus 30' and that the DC voltage has a ripple of approximately 4%, it can be seen that the capacitive element C1 will charge through the diode element D1 to the peak DC voltage, which, for example, may be 10 volts. Generally as subsequent ripple valleys and peaks occur at the PLUS and MINUS terminals, the capacitive element will maintain its peak voltage. In one embodiment of the invention, the capacitive element C1 and the resistive elements R1 and R3 have a collective time constant of approximately 60 milliseconds. The resistive elements R1 and R3 in addition to providing a very slow discharge path for the capacitive element C1 comprise a voltage divider. In a preferred embodiment of the invention the values of the resistive elements R1 and R3 are such that 20% of the voltage stored on the capacitive element C1 is impressed in positive voltage orientation from the base to emitter of the switching means or transistor Q1. This of course neglects the effect of leakage resistance in the transistor and the voltage drop across diode elements. In a preferred embodiment of the invention, this voltage may amount to 2 volts. It can be readily seen that the voltage percentage or ratio may be varied to other values than the 20% value which was chosen for convenience of illustration. In this embodiment of the invention, the significant votage bias provided from the base to emitter of the transistor Q1 maintains that transistor in the ON or conducting state. This has the effect of shorting out the Zener diode D3, which is a voltage limiter and of keeping the capacitive element C2 discharged by way of a discharge circuit including the transistor element Q1, the diode element D4 and the resistive element R5. Consequently, current which flows between the PLUS and MINUS terminals will take a path through the diode element D2, the resistive element R4 and the relatively low impedance conducting transistor Q1. According to the example previously discussed, when the valley of the DC ripple is impressed across the PLUS to MINUS terminals, the emitter of the transistor Q1 wil raise in value relative to its base. However, since the ripple is approximately 4% of the peak value and the base voltage is approximately 20% of the peak value, it can be easily seen that this slight increase in emitter voltage relative to the peak voltage will not change the conducting status of the transistor Q1. Assume now that the ripple voltage component increases significantly, this can be due to the fact that one of the lines L1, L2 and L3 shown in FIG. 1 has a blown fuse therein or otherwise loses current flow therethrough completely or significantly though not totally. Presume, for example, that this produces a voltage ripple of approximately 30%, which is arbitrarily chosen merely for convenience of illustration. It can be seen in this example that as the valley of the ripple is approached, the 20% of peak value point of the voltage divider is eventually passed by the ripple voltage envelope. This will raise the emitter of the transistor Q1 to a voltage value above the base voltage value thereof and have the effect of turning OFF the normally conducting transistor Q1. When this happens, a voltage pulse appears at the high side of the capacitive element C2. Of course the voltage pulse is limited by the regulating value of the Zener diode D3, which may, for example, be 24 volts. This voltage pulse is applied to the capacitive element C2 which causes charging of the capacitive element C2 through the diode D5 and the capacitive element C3. The voltage at the low side of the capacitive element C2 reverse biases the diode D4. In addition, the resistive elements R6 and R7 are significantly higher in impedance value than the capacitive element C3 at 60 Hertz. It if for this reason that the charging path between the PLUS and MINUS terminals includes at this time the diode element D2, the resistive element R4 which limits the charging current through the capacitive element C2, the capacitive element C2, the diode D5, and the capative element C3. Because of the relative values of capacitance of the capacitive elements C2 and C3, the capacitive element C2 is more quickly fully charged than the capacitive element C3. When the voltage envelope of the DC ripple increases in value relative to the PLUS terminal once again this has the effective of forward biasing the transistor Q1 and thus removes the voltage pulse which was previously applied. When this occurs, the capacitive element C2 quickly discharges through the conducting transistor Q1 and the now conducting diode D4, as well as the resistive element R5. This quickly reduces the voltage on the anode of the diode D5 to a voltage value below the value stored on the capacitive element C3. When this happens, the diode element D5 becomes reverse biased. The discharge path for the capacitive element C3 is then through the resistive element R6 and the resistive element R7 as well as the nonconducting complementary pair Q2-Q3. It can be seen that the capacitive element C3 therefore will not discharge appreciably if the resistive element R6 is significantly large. In a preferred embodiment of the invention, the discharge time for the capacitive element C3 may be as much as 500 millisecconds. As the voltage envelope of the ripple component once again approaches the valley value, the transistor element Q1 is once again turned OFF, causing the capacitive element C2 to be charged again and causing the capacitive element C3 to accumulate additional charge and a higher terminal voltage. This operation is repeated over a number of ripple cycles until the capacitive element C3 has accumulated a sufficient charge to provide a voltage value at the positive side of the capacitive element C3 which is larger than the voltage value on the base of the transistor Q2. When this occurs, the transistor Q2 conducts, causing the transistor Q3 to quickly be placed in a status of conduction. This, then, provides discharge paths for the capacitive elements C3 and C6 through the complementary pair Q2-Q3 and through the diode D13 to the line 30a'/30a'', as the case may be, to cause a tripping of a circuit breaker 45/45' or the energization of an output switch or any other useful function. It will be noted that the resistive element R8 provides a relatively high impedance path relative to the diode element D13 for current flowing out of the emitter of the transistor Q3. This has a tendency to shunt the current to the diode D13 and into the trip circuit for the tripping operation. The return path from the apparatus served by the trip circuit on lines 30a'/30a''is to the negative bus 50. As the capacitive element C6 is discharged through the complementary pair Q2-Q3, the voltage on the top plate thereof reduces in value; however, because of the presence of the diodes D7-D9, the voltage on the top terminal of capacitive element C5 does not significantly reduce in value. Consequently, the voltage on the gate G of the programmable unijunction transistor Q4 eventually becomes less than the voltage on the anode A. When this happens, the programmable unijunction transistor Q4 conducts. Current is thereby provided from both the capacitive element C5 and C6 through the cathode C of the programmable unijunction transistor Q4 to the light emitting diode LED2 of the light coupled pair LCP. The current then returns to the appropriate plates on the respective capacitors C5 andd C6 through various paths. When this happens, the light emitting diode LED2 provides light energy to the light sensitive silicon controlled rectifier SCR1, causing that latter element to conduct. This provides a closed path for electrical power from the POWER source through the resistive element R12 and the light emitting diode LED1, through the conducting silicon controlled rectifier SCR1 and back to the return terminal on the POWER source. The light emitting diode LED1 thereby provides an illuminated indication of a trip signal being provided by the way of the diode D13 to the trip terminal TRIP. It can be seen that the apparatus 30' (or 30'', as the case may be) can provide a tripping function in response to a drop-out of phase current, a diminution of phase current or an increase of phase current on one or more phases of a three-phase load, as is shown in FIG. 1, or it can provide a DC ripple detector indication, such as is indicated at 30'' in FIG. 2.

Referring now to FIG. 3A again, the ripple detector RDDN' is utilized for accomplishing the same purpose as ripple detector RDN of FIG. 3. In this case, however, the PNP transistor Q1' is used rather than the NPN transistor Q1 of FIG. 3. Once again, the capacitive element C1' is charged by way of the diode element D1' from PLUS to MINUS. The capacitive element C1' holds the peak voltage for a relatively long period of time. The discharge path of the capacitive element C1' is through the resistive elements R1' and R3'. In this case, the relative values of the resistive elements R1' and R3' are chosen so that the voltage drop across the resistive element R1' is determinative of the ripple value to be measured. It will be noted that the example given with respect to FIG. 3 concerning the amount of percentage of voltage on the base of the transistor Q1 was aimed at a 20% ripple detection by providing approximately 2 volts out of a peak value of 10 volts at the junction between the resistive elements R1, R2 and R3 relative to the MINUS terminal. To accomplish the same purpose with respect to the apparatus of FIG. 3A, the percentage of voltage at the junction point between the resistive elements R1', R2' and R3' should be approximately 80% of the full voltage across the capacitive element C1' relative to the MINUS terminal. Generally, the transistor element Q1' is in an ON state as long as the ripple value does not exceed the predetermined percentage, which in this case is 20%. However, as the voltage envelope approaches a valley where the ripple content is greater than 20%, the transistor element Q1' will turn off. When this happens, the capacitive element C2 discharges in a manner similar to that described with respect to FIG. 3 — that is, current flows from the positive plate of the capacitive element C2 through the resistive element R4a' back up through the resistive element R5 shown in FIG. 3 through the conducting diode D4 shown in FIG. 3 and back to the negative plate of the capacitive element C2. As the ripple envelope moves away from the previously described valley and toward a peak value once again, the transistor element Q1' turns on once again. This allows current to flow through the ON transistor element Q1' through the capacitive element C2, through the diode D5 shown in FIG. 3 to charge the capacitive element C3 shown in FIG. 3 in the manner previously described with respect to FIG. 3. The remainder of the operation of the circuit is similar to that described with respect to the circuit of FIG. 3. With respect to the embodiments of FIG. 3 and FIG. 3A it can be seen that ripple percentage is measured relative to the peak value of voltage — that is, ripple is detected by measuring the difference between the peak value of the voltage envelope and the valley value of the voltage envelope.

Figure 4:
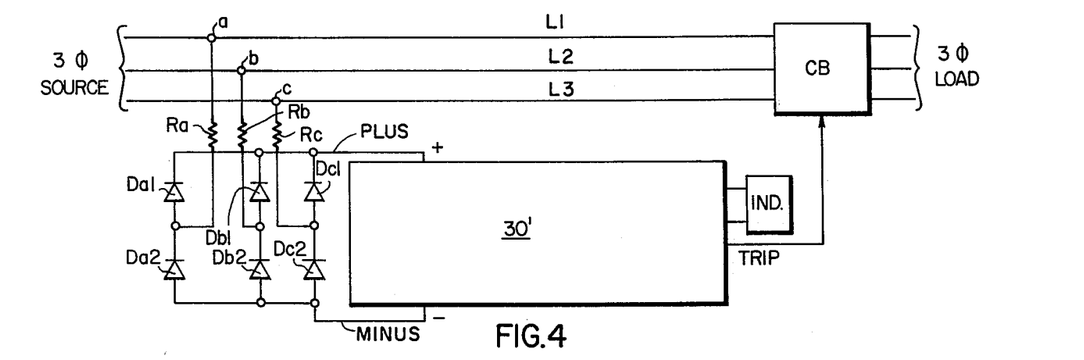
FIG. 4 shows a circuit protective system similar to the one shown in FIG. 1 where a voltage sensitive interconnection network is provided rather than a current sensitive interconnection network.

Referring now to FIG. 4, still another embodiment of the invention is shown. In this case, the apparatus 30' discussed with respect to FIG. 3 and FIG. 3A, is shown in block diagram form. Also shown associated therewith are the indicator IND and the trip line TRIP. The TRIP line feeds the circuit breaker, generally designated CB, which is connected in series circuit relationship with three lines, L1, L2 and L3, which lines provide electrical power between a three-phase source on the left and a three-phase load on the right. In this case, the PLUS and MINUS terminals of the circuit of FIG. 3 are connected to sense voltage directly from the lines L1, L2 and L3 rather than to sense line current expressed in terms of voltage as is shown with respect to the embodiments of FIG. 1 and FIG. 2. In order to accomplish this, three separate diode circuits are connected in parallel circuit relationship with the PLUS and MINUS terminals of circuit 30' of FIG. 4. The first diode circuit comprises two diodes Da1 and Da2 connected in series circuit relationship with each other. The anode of diode Da2 is connected to the MINUS terminal of the apparatus 30' and the cathode of the diode Da2 is connected to the anode of the diode Da1. The cathode of the diode Da1 is connected to the PLUS terminal of the phase imbalance logic circuit or DC ripple detector 30'. Likewise, diodes Db1 and Db2 and Dc1 and Dc2 are connected in similar series circuit relationship with the PLUS and MINUS terminals. Connected between the junction of the diode Da1 and Da2 is an electrical line which is directly tied to a point a on the power line L1. Similarly, connected between the diodes Db1 and Db2 is a line which is connected directly at point b to a portion of line L2; and finally, a line is connected between the diodes Dc1 and Dc2 to a point c on the line L3. Consequently, the instantaneous voltages of these lines are superimposed upon one another in a half wave rectified disposition so as to provide inputs to the PLUS and MINUS terminals of the apparatus 30' similar to the inputs previously described with respect to the embodiments of FIG. 1 and FIG. 2. In another embodiment of the invention shown in FIG. 1, primary windings of transformers may be interconnected either in delta or Y configuration or any combination thereof between the lines L1, L2 and L3 to feed secondary windings which are also connected in Y or delta or similar combinations to the midpoint of the previously described diode bridges Da1, Da2, ect,.

It is to be understood with respect to the embodiments of this invention that the kind of the load to be protected may be a motor or any other kind of three-phase load where phase current dropout, diminution or enlargement is possible. It is also to be understood that the concepts of this invention may be utilized to correct for phase imbalance or to detect DC ripple. It is also to be understood that the ripple detector taught with respect to FIG. 3 may be utilized to provide input information to electrical circuit apparatus other than that shown in FIG. 3. It is also to be understood that the various time consonants of the capacitive element described herein are not limiting. It is also to be understood that the percentage ripple values which were arbitrarily chosen to be 20% for illustrative purposes are also not limiting. It is also to be understood that the capacitive element C7 shown in FIG. 3 is useful for providing electrical energy to charge the capacitive elements C2 and C3 in the case of a complete line dropout — that is, where the ripple value goes to as high as 100% in certain conditions. It is also to be understood that the appartus taught in this invention may utilize 60 Hz. power or power of other frequencies.

The apparatus embodied in the teachings of this invention has many advantages. One advantage lies in the fact that phase dropout, dimunition or enlargement of a three-phase or multi-phase current may be detected by utilizing the ripple component of the full wave rectified current of the circuit. Since ripple detection is measured from peak value of valley value in this situation, ripple detection of a high degree of sensitivity and accuracy may be attained. Another advantage associated with this invention lies in the fact that phase failure which is not complete — that is, where the phase current does not reduce itself to zero, may be detected utilizing the concepts of this invention.

We claim:

1. A direct current ripple detector, comprising:
  a. positive input terminal means connected to the positive terminal of a voltage source of direct current which has a component of voltage ripple wherein:
  b. negative input terminal means connected to the negative terminal of said source:
  c. diode means having cathode means and anode means, said cathode means being connected to said negative input terminal means;
  d. storage means, one terminal of which is connected to said positive input terminal means and another terminal of which is connected to said anode means for storing for a predetermined duration a stored voltage value which is generally equivalent to the highest value of voltage of said source;
  e. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and
  f. switch means having a first terminal means, a second terminal means and a gate terminal means for being turned on to a conducting state in response to the presence of a predetermined value of voltage which is oriented positive to negative from said gate terminal means to said second terminal means, respectively, and for being turned off to a nonconducting state in response to a second predetermined value of voltage which is oriented negative to positive from said gate terminal means to said second terminal means, respectively, said first termianl means being connected to said positive input terminal, said second terminal means being connected to said negative terminal means, said gate terminal means being connected to said first divider means output terminal means, said second voltage divider means output terminal means being connected to said anode means, said voltage between said first and said second terminal means of said switch being capable of varying generally instantaneously in relation to said component or ripple of said direct current voltage of said source, the voltage value at said second terminal means of said switch means relative to said voltage of said positive input terminal means generally tracking said components of ripple when said gate terminal means voltage of said switch means remains generally fixed at said highest value of voltage of said source for said predetermined duration, the presence of said diode means allowing the latter relationship between said gate terminal means voltage and said second terminal means voltage to exist, said switch means therefore being turned off only when said second terminal means voltage is generally more positive than said gate terminal means voltage relative to the instantaneous voltage of said positive input terminal means to thereby indicate a predetermined difference in value between said stored highest value of source voltage and a lower voltage during said predetermined duration, said predetermined difference being related to said predetermined percentage, of said voltage divider means.

2. The combination as claimed in claim 1 wherein said storage means comprise a capacitor.

3. The combination as claimed in claim 1 wherein said switch means comprises a transistor, wherein said gate terminal means comprises a transistor base, said first terminal means comprises a transistor collector and said second terminal means comprises a transistor emitter.

4. A direct current ripple detector and protection device for a source of direct current, comprising:
  a. positive input terminal means connected to the positive terminal of a voltage source of direct current which has a component of voltage ripple therein;
  b. negative input terminal means connected to the negative terminal of said source;
  c. diode means havng cathode means and anode means, said cathode means being connected to said negative input terminal means;
  d. storage means, one terminal of which is connected to said positive input terminal means and another terminal of which is connected to said anode means for storing for a predetermined duration a storred voltage value which is generally equivalent to the highest value of voltage of said source;
  e. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and
  f. switch means having a first terminal means, a second terminal means and a gate terminal means for being turned onto a conducting state in response to the presence of a predetermined value of voltage which is oriented positive to negative from said gate terminal means to said second terminal means, respectively, and for being turned off to a nonconducting state in response to a second predetermined value of voltage which is oriented negative to positive from said gate terminal means to said second terminal means, respectively, said first terminal means being connected to said positive input terminal, said second terminal means being connected to said negative terminal means, said gate terminal means being connected to said first divider means output terminal means, said second voltage divider means output terminal means being connected to said anode means, said voltage between said first and said second terminal means of said switch being capable of varying generally instantaneously in relation to said component or ripple of said direct current voltage of said source, the voltage value of said second terminal means of said switch means relative to said voltage of said positive input terminal means generally tracking said components of ripple when said gate terminal means voltage of said switch means remains generally fixed at said highest value of voltge of said source for said predetermined duration, the presence of said diode means allowing the latter relationship between said gate terminal means voltage and said second terminal means voltage to exist, said switch means therefore being turned off only when said second terminal means voltage is generally more positive than said gate terminal means voltage relative to the instantanteous voltage of said posivite input terminal means to provide an electrical pulse to indicate a predetermined difference and a lower value of said instantaneous direct current voltage during said predetermined duration, said predetermined difference being related to said predetermined percentage of said voltage divider means;

g. a pulse accumulator to count said electrical pulses; and h. means interconnected with said source and said pulse accumulator for operating upon said source to protect said source when said accumulated pulses attain a predetermined quantity.

5. The combination as claimed in claim 4 wherein said storage means comprises a capacitor.

6. The combination as claimed in claim 4 wherein said switch means comprises a transistor, wherein said gate terminal terminal comprises a transistor base, said first terminal terminal comprises a transistor collector and said second terminal means comprises a transistor emitter.

7. A phase imbalance detector and circuit interrupter system for isolating a three-phase electrical source from a three-phase electricl load when phase current imbalance occurs, comprising:

a. converting means for converting phase current into direct current voltage with a component of ripple therein, said converting means having a positive terminal and a negative terminal;

b. positive input terminal means connected to said positive terminal of said converting means;

c. negative input terminal means connected to said negative terminal of said converting means;

d. diode means having cathode means and anode means, said cathode means being connected to said negative input terminal means;

e. storage means, one terminal of which is connected to said positive input terminal means and another terminal of which is connected to said anode means for storing for a predetermined duration a stored voltage value which is generally equivalent to the highest value of voltage of said converting means;

f. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and g. switch means having a first terminal means, a second terminal means and a gate terminal means for being turned on to a conducting state in response to the presence of a predetermined value of voltage which is oriented positive to negative from said gate terminal means to said second terminal means, respectively, and for being turned off to a non-conducting state in response to a second predetermined value of voltage which is oriented negative to positive from said gate terminal means to said second terminal means, respectively, said first terminal means being connected to said positive input terminal, said second terminal means being connected to said negative terminal means, said gate terminal means being connected to said first divider means output terminal means, said second voltage divider means output terminal means being connected to said anode means, said voltage between said first and said second terminal means of said switch being capable of varying generally instantaneously in relation to said component or ripple of said direct current voltage of said converting means, the voltage value at said second terminal means of said switch means relative to said voltage of said positive input terminal means generally tracking said components of ripple when said gate terminal means voltage of said switch means remains generally fixed at said highest value of voltage of said source for said predetermined duration, the presence of said diode means allowing the latter relationship between said gate terminal means voltage and said second terminal means voltage to exist, said switch means therefore being turned off only when said second terminal means voltage is generally more positive than said gate terminal means voltage relative to the instantaneous voltage of said positive input terminal means to thus provide an electrical pulse to thereby indicate a predetermined difference in value between said stored highest value of voltage and a lower value of said instantaneous direct current voltage during said predetermined duration, said predetermined difference being related to said predetermined percentage of said voltage divider means;

h. pulse accumulator means to count said electrical pulses; and i. circuit interrupter means interconnected between said three-phase load and said three-phase source to isolate one from the other when said accumulated pulses attain a predetermined quantity.

8. The combination as claimed in claim 7 wherein said storage means comprises a capacitor.

9. The combination as claimed in claim 7 wherein said switch means comprises a transistor wherein said gate terminal means comprises a transistor base, said first terminal means comprises a transistor collector and said second terminal means comprises a transistor emitter.

10. A direct current ripple detector, comprising:

a. positive input terminal means connected to the positive terminal of a voltage source of direct current which has a component of voltage ripple therein;

b. negative input terminal means connected to the negative terminal of said source;

c. diode means having cathode means and anode means, said anode means being connected to said negative input terminal means;

d. storage means, one terminal of which is connected to said negative input terminal means and another terminal of which is connected to said cathode means for storing for a predetermined duration a stored voltage value which is generally equivalent to the highest value of voltage of said source; and e. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and f. switch means having a first terminal means, a second terminal means and a gate terminal means for being turned on to a conducting state in response to the presence of a predetermined value of voltage which is oriented positive to negative from said second terminal means to said gate terminal means, respectively, and for being turned off to a nonconducting state in response to a second predetermined value of voltage which is oriented negative to positive from said second terminal means to said gate terminal means, respectively, said first terminal means being connected to said negative input terminal, said second terminal means being connected to said positive terminal means, said gate terminal means being connected to said first divider means output terminal means, said second voltage divider means output terminal means being connected to said cathode means, said voltage between said first and said second terminal means of said switch being capable of varying generally instantaneously in relation to said component or ripple of said direct current voltage of said source, the voltage value at said second terminal means of said switch means relative to said voltage of said positive input terminal means generally tracking said components of ripple when said gate terminal means voltage of said switch means remains generally fixed at said highest value of voltage of said source for said predetermined duration, the presence of said diode means allowing the latter relationship between said gate terminal means voltage and said second terminal means voltage to exist, said switch means therefore being turned off only when said second terminal means voltage is generally more negative than said gate terminal means voltage relative to the instantaneous voltage of said positive input terminal means to thereby indicate a predetermined difference in value between said stored highest value of source voltage and a lower voltage during said predetermined duration,, said predetermined difference being related to said predetermined percentage of said voltage divider means.

11. The combination as claimed in claim 10 wherein said storage means comprises a capacitor.

12. The combination as claimed in claim 10 wherein said switch means comprises a transistor, wherein said gate terminal means comprises a transistor base, said first terminal means comprises a transistor collector and said second terminal means comprises a transistor emitter.

13. A direct current ripple detector and protection device for a source of direct current, comprising:

a. positive input terminal means connected to the positive terminal of a voltage source of direct current which has a component of voltage ripple therein;

b. negative input terminal means connected to the negative terminal of said source;

c. diode means having cathode means and anode means, said anode means being connected to said negative input terminal means;

d. storage means, one terminal of which is connected to said negative input terminal means and another terminal of which is connected to said cathode means for storing for a predetermined duration a stored voltage value which is generally equivalent to the highest value of voltage of said source;

e. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and f. switch means having a first terminal means, a second terminal means and a gate terminal means for being turned on to a conducting state in response to the presence of a predetermined value of voltage which is oriented positive to negative from said second terminal means to said gate terminal means, respectively, and for being turned off to a nonconducting state in response to a second predetermined value of voltage which is oriented negative to positive from said second terminal means to said gate terminal means, respectively, said first terminal means being connected to said negative input terminal, said second terminal means being connected to said positive terminal means, said gate terminal means being connected to said first divider means output terminal means, said second voltage divider means output terminal means being connected to said cathode means, said voltage between said first and said second terminal means of said switch being capable of varying generally instantaneously in relation to said component or ripple of said direct current voltage of said source, the voltage value at said second terminal means of said switch means relative to said voltage of said positive input terminal means generally tracking said components of ripple when said gate terminal means voltage of switch means remains generally fixed at said highest value of voltage of said source for said predetermined duration, the presence of said diode means allowing the latter relationship between said gate terminal means voltage and said second terminal means voltage to exist, said switch means therefore being turned off only when said second terminal means voltage is generally more negative than said gate terminal means voltage relative to the instantaneous voltage of said positive input terminal means to provide an electrical pulse to indicate a predetermined difference in value between said stored highest value of source voltage and a lower value of said instantaneous direct current voltage during said predetermind duration, said predetermined difference being related to said predetermined percentage of said voltage divider means;

g. a pulse accumulator to count said electrical pulses; and h. means interconnected with said source and said pulse accumulator for operating upon said source to protect said source when said accumulated pulses attain a predetermined quantity.

14. The combination as claimed in claim 13 wherein said storage means comprises a capacitor.

15. The combination as claimed in claim 13 wherein said switch means comprises a transistor, wherein said gate terminal means comprises a transistor base, said first terminal means comprises a transistor collector and said second terminal means comprises a transistor emitter.

16. A phase imbalance detector and circuit interrupter system for isolating a three-phase electrical source from a three-phase electrical load when phase current imbalance occurs, comprising:

a. converting means for converting phase current into direct current voltage with a component of ripple therein, said converting means having a positive terminal and a negative terminal;

b. positive input terminal means connected to said positive terminal of said converting means;

c. negative output terminal means connected to said negative terminal of said converting means;

d. diode means having cathode means and anode means, said anode means being connected to said negative input terminal means;

e. storage means, one terminal of which is connected to said negative input terminal means and another terminal of which is connected to said cathode means for storing for a predetermined duration a stored voltage value which is generally equivalent to the highest value of voltage of said converting means;

f. voltage divider means connected in parallel circuit relationship with said storage means, said divider means having first and second output terminal means, said divider means providing a second voltage value in positive to negative voltage relationship between said first and said second output terminal means, respectively, said latter voltage value being equivalent to a predetermined percentage of said stored voltage value; and g. switch means having a first terminal means, a second terminal means and a gate terminal means for being turned on to a conducting state in response to the presence of a predetermined value of voltage which is oriented positive to negative from said second terminal means to said gate terminal means, respectively, and for being turned off to a nonconducting state in response to a second predetermined value of voltage which is oriented negative to positive from said second terminal means to said gate terminal means, respectively, said first terminal means being connected to said negative input terminal, said second terminal means being connected to said positive terminal means, said gate terminal means being connected to said first divider means output terminal means, said second voltage divider means output terminal means being connected to said cathode means, said voltage between said first and second terminal means of said switch being capable of varying generally instantaneously in relation to said component or ripple of said direct current voltage of said converting means, the voltage value at said second terminal means of said switch means relative to said voltage of said positive input terminal means generally tracking said components of ripple when said gate terminal means voltage of said switch means remains generally fixed at said highest value of voltage of said source for said predetermined duration, the presence of said diode means allowing the latter relationship between said gate terminal means voltage and said second terminal means voltage to exist, said switch means therefore being turned off only when said second terminal means voltage is generally more negative than said gate terminal means voltage relative to the instantaneous voltage of said positive input terminal means to thus provide an electrical pulse to thereby indicate a predetermined difference in value between said stored highest value of voltage and a lower value of said instantaneous direct current voltage during said predetermined duration, said predetermined difference being related to said predetermined percentage of said voltage divider means;

h. pulse accumulator means to count said electrical pulses; and i. circuit interrupter means interconnected between said three-phase load and said three-phase source to isolate one from the other when said accumulated pulses attain a predetermined quantity.

17. The combination as claimed in claim 16 wherein said storage means comprises a capacitor.

18. The combination as claimed in claim 16 wherein said switch means comprises a transistor wherein said gate terminal means comprises a transistor base, said first terminal means comprises a transistor collector and said second terminal means comprises a transistor emitter.

* * * * *